United States Patent [19]

Williams

[11] Patent Number: 4,787,432

[45] Date of Patent: Nov. 29, 1988

[54] APPARATUS AND METHOD FOR PRODUCING MORTISE AND TENON JOINTS

[76] Inventor: James D. Williams, 28544 N. Highway 67, Woodland Park, Colo. 80863

[21] Appl. No.: 207,511

[22] Filed: Jun. 15, 1988

[51] Int. Cl.$^4$ .......................... B27M 3/00; B27M 1/08
[52] U.S. Cl. ...................................... 144/367; 33/197; 33/562; 144/82; 144/144 R; 144/144.5 R; 144/371; 144/372; 409/130
[58] Field of Search ....................... 144/82, 83, 84, 87, 144/144 R, 144.5, 367, 371, 372, 203, 204; 33/197, 562, 566, 567, 573; 409/130, 182

[56] References Cited

U.S. PATENT DOCUMENTS

| | | | |
|---|---|---|---|
| 3,109,466 | 11/1963 | Jones | 144/144 |
| 3,150,452 | 9/1964 | Meuwissen | 33/197 |
| 3,800,840 | 4/1974 | McCord, Jr. | 144/87 |
| 4,168,730 | 9/1979 | Keller | 144/326 |
| 4,373,562 | 2/1983 | Vernon | 144/144.5 |
| 4,407,344 | 10/1983 | Dicke | 144/87 |
| 4,479,523 | 10/1984 | Peterson et al. | 144/144.5 |
| 4,595,040 | 6/1986 | Glisman | 144/84 |
| 4,607,673 | 8/1986 | McCord, Jr. | 144/144.5 |

Primary Examiner—W. Donald Bray
Attorney, Agent, or Firm—Linda F. Gould

[57] ABSTRACT

A single mortise or a plurality of conveniently spaced mortises may be created in a single workpiece. A corresponding single or plurality of tenons may be created in a second workpiece to be joined to the first workpiece. The method of creating the mortises and tenons involves the use of a tool, containing a rigid plate against which a workpiece may be secured, and a template positioned so that the lower face of the template is adjacent to the rigid plate. The template contains a mortise guide, consisting of openings in the template through which a router may be inserted to carve mortises in the workpiece. The template also contains a first tenon guide, against which a router may be guided to carve one half of a tenon or series of tenons in a workpiece. The template also contains a second tenon guide, consisting of a pattern of the same size and shape, and opposite in orientation, to the pattern of the first tenon guide. The template may be moved with respect to the workpiece secured to the rigid plate by means of template slides movable along rods extending from the rigid plate.

18 Claims, 4 Drawing Sheets

APPARATUS AND METHOD FOR PRODUCING MORTISE AND TENON JOINTS

BACKGROUND OF THE INVENTION

Technical Field

This invention pertains to the production of mortises and tenons in workpieces comprising corresponding pieces of wood, or other material, by means of a router used in conjunction with a novel tool used as a guide. The tool enables tenons to be formed in a manner which exactly conforms to mortises formed in a corresponding workpiece, so that the workpieces may be fitted together with the mortises and tenons providing a strong joint. The tool is accurately adjustable to allow precise location and width of tenons and mortises.

Background Art

A router is frequently used to fashion various kinds of joints in wood stock or other material. Such joints are necessary to build strong furniture and other objects. The router is typically equipped with a rotating bit with blade sides which cuts away portions of a workpiece as the bit comes in contact with that workpiece. In this manner, the router blade may be inserted into a workpiece to cut out wood to form a cavity, or mortise. Similarly, the router may be guided along the outside of a corresponding workpiece to cut away enough material that a tenon is formed that will fit into the mortise.

The strength of the joint formed depends on a number of factors. A variety of shapes of tenons and mortises may be utilized, for unique purposes of strength or decoration, including straight-sided circles, ovals, rectangles, and various corrugated designs. The mortise may be blind, or may go through the stock. A dovetail joint utilizes tenons with angled sides, which are matched to mortises with corresponding angles. Each of these joints may be particularly advantageous in a given situation, depending on the types and directions of force to which the joint is likely to be subjected.

When working with wood, the strength of a glued joint depends to some extent on grain patterns. For instance, joining two workpieces so that a long grain surface of one piece contacts the long grain of the other creates an especially strong joint. One purpose of the mortise and tenon is to allow such long grain-to-long grain construction in joining sides of frames.

The strength of a mortise and tenon joint also depends to a large extent on whether the pattern of the tenon fits snugly into the mortise cavity. Thus, a number of patterning jigs have been developed to provide a guide for the router bit, in an effort to shape tenons with the exact thickness and design of the corresponding mortises. The router may be held against the jig in one of several manners. A router guide bushing may be attached to the base of the router, to provide a circular liner around the uppermost part of the rotating bit, which liner may be held adjacent to the jig. Alternatively, a shank mounted guide bearing may be installed at the top of the rotating bit, and this bearing used to hold the router in place with respect to the jig.

A number of jigs are known in the prior art to provide a guide for a router to cut dovetail mortises and tenons. The jigs described in U.S. Pat. No. 3,800,840 to McCord, Jr., U.S. Pat. No. 4,168,730 to Keller, and U.S. Pat. No. 4,607,673 to McCord, Jr., are each suitable to the creation of dovetail joints, but are not appropriate to fashion straight-sided mortises and tenons.

The jig described in U.S. Pat. No. 3,150,452 to Meuwissen is attachable to a door frame for the purpose of guiding a router to create a mortise to receive a lock or hinge. No method is described by which a tenon corresponding to the mortise could be made.

The patterning jig described in U.S. Pat. No. 4,595,040 to Glisman may be used to cut a single straight-edged mortise and a single corresponding tenon. The workpiece is inserted inside the jig structure, and the router is moved along the oval guide. Only a single mortise and tenon, as opposed to a row of tenons and mortises, may be cut while the wood is held inside the jig.

The combination bench router fixture described in U.S. Pat. No. 3,109,466 to Jones is designed for the cutting of a single round tenon. The fixture does not provide a means for creating a mating mortise.

The Mortise and Tenon Jig taught in U.S. Pat. No. 4,479,523 to Peterson et al. may be used to fashion multiple mortise and tenon joints. This device is most useful when creating mortise and tenon joints in stock of the same width, and particularly in stock of standard width which the jig is designed to accommodate.

When using the Peterson device, tenons are cut in a two step process. In the first step, approximately half of the tenon is cut, by guiding the router from the center of one cheek around the end to the center of the other cheek. Next, the template is turned over, so that the same guide is used to cut the corresponding other half of the tenon. Alternatively, the stock may be inverted within the template to cut the second half of the tenon. If the router is turned so as to alter the distance between the guide bushing and the bit, at the point where the guide touches the jig, or if the template is not perfectly aligned after inversion, the cuts created in each of the two steps may not exactly match. As a result, each cheek of the tenon may contain a ridge, which impedes insertion and exact fit of the tenon into the mortise.

The Jones and Peterson devices may be used to produce multiple tenons. With the Jones device, the location of the workpiece is adjusted to permit consecutive cutting of multiple tenons. The Peterson device allows production of multiple tenons and mortises by moving the template of the jig along the workpiece to predetermined locations along the jig, or by moving the workpiece within the jig. As multiple tenons are fashioned with either device, no protection is provided to any adjacent tenon previously made. If the router is moved away from the tenon being cut, toward the existing tenon, that tenon may be dented or otherwise damaged by the errant router blade.

Although devices are known in the prior art by which straight mortise and tenon joints may be made, these devices share certain limitations. The fit of a mating mortise and tenon is cumulatively dependent on variations in router bit diameter, the bushing guide, eccentricity of bushing guide and router bit, alignment pin location, and other machine inaccuracies. In the existing devices, there is no accurate adjustment to compensate for the inevitable inaccuracies of device manufacturing tolerance, bushing guide diameter and router bit diameter, resulting in improperly fitting mortises and tenons.

Furthermore, accurate tenons are fashioned only if the template, when inverted, is perfectly realigned on pegs or attaching pins, and the router used for cutting is not rotated so as to change the distance between the blade and the router guide. The joint may be fashioned in the middle of standard width stock, but these devices do not provide an adjustably, accurate method of cutting mortise and tenon joints in stock of differing widths. Although some devices may be used to produce multiple tenons on a single workpiece, there is a practical danger that previously fashioned tenons may be damaged as successive tenons are formed.

DISCLOSURE OF THE INVENTION

Summary of the Invention

An object of this invention is to provide a guide for cutting single or multiple mortise and tenon joints, where the thickness of each tenon is accurately and simply adjusted so as to precisely fit matching mortises.

Another object of this invention is to enable the cutting of mortises and tenons at selected locations across the width of stock, either independently or at the same distance from a common face. The invention also permits the production of matching mortises and tenons in stock of unequal thickness, to allow such stock to be joined.

A tool is utilized in this method of forming mortise and tenon joints and acts as a guide for a router or other similar cutting device with a rotating cutting bit. The router is moved along a template within the tool, to cut a mortise or tenon of the desired thickness and shape.

The template includes three distinct cutting guides: a mortise guide and first and second tenon guides. The mortise guide is used for fashioning a single mortise or multiple mortises and comprises a plurality of openings through which the router bit may be inserted. The shape and width of these openings varies, corresponding to the shape and width of the mortises to be fashioned. By way of example, if mortises with straight edges and rounded ends are desired, the shape of each opening will be straight edges with rounded ends. The openings are conveniently spaced so that the router may be inserted into and moved around the interior of each opening, to produce corresponding mortises at convenient distances with respect to each other in a workpiece held adjacent to the underside of the template.

The first tenon cutting guide may be located on one edge of the template. Alternatively, the first tenon guide may be located in the interior of the template, forming one edge of an opening within the template sufficiently wide to permit the router bit to be inserted through the opening into wood held adjacent to the underside of the template. This latter location has the advantage that the base of the router may be held in contact with the template on all sides of the first tenon guide, so that the router will be established in a position for accurate cutting. The first tenon guide is designed so that one-half of each tenon is cut when a router is moved along the edge of the template while a workpiece is held adjacent to the underside of the template. The first tenon guide allows half of each tenon formed to include one of the two longest sides of that tenon, so that each longest side is cut with a single router cut. The guide configuration causes each half tenon to correspond in size and shape to the mortises produced by following the mortise guide.

The second tenon guide is of the same size and shape as the first tenon guide, but opposite in orientation. The second tenon guide may be located on one edge of the template, or located in the interior of the template, forming one edge of an opening within the template sufficiently wide to permit the router bit to be inserted through the opening into a workpiece held adjacent to the underside of the template, while the router guide is held in contact with the second tenon guide. The mortise guide may advantageously be evenly spaced from both the first tenon guide and the second tenon guide, so that the mortise guide is located in the center of and the same distance from the two tenon guides.

The template is positioned adjacent and perpendicular to a rigid plate, against which the workpiece may be secured by a clamp or other holding device. The tool is constructed so that the template may be moved with respect to the rigid plate, so as to permit the appropriate cutting guide to be positioned over the workpiece in the desired location, as the mortises and each half of the tenons is formed. The movement of the template with respect to the rigid plate may be accomplished by mounting the template on two template slides, each attached to the underside of the template, which template slides are slideably mounted on two rods extending perpendicular to the rigid plate and parallel to the underside of the template. Each rod is sufficiently long to permit the template to be moved from a position with respect to the rigid plate which permits one half of each tenon to be formed in a workpiece held adjacent to the rigid plate, by moving a router along the first tenon guide, to a position in which the other half of each tenon may be formed by following the second tenon guide, while the workpiece is held in the same position against the rigid plate. The template may be held in a particular position with respect to the rigid plate by tightening slide locking screws in the template slides, so as to arrest the movement of the template slides along the rods.

The movement of the template with respect to the rigid plate may be accomplished in a myriad of different ways. A connecting piece, such as a strip of angle iron, may be mounted on the underside of the template. This connecting piece may be designed so as to permit movement along rods extending perpendicular to the rigid plate. For example, a connecting piece consisting of a strip of angle iron, with a plurality of slots shaped to fit around screw-type rods, may be moved to desired positions along such rods, and held in place by a nut and bolt arrangement. Such a construction would permit inversion of the template with respect to the rigid plate and the workpiece held adjacent to the rigid plate, as well as movement of the template along the rods.

The tool may be constructed so that a number of adjustments are conveniently available. The extent of movement of the template with respect to the rigid plate may be altered by the location of a thickness adjusting nut at the end of each rod which is opposite the rigid plate for minute adjustment of tenon thickness. The position of the template with respect to the rigid plate may be adjusted by loosening a template locking screw in each template slide, to permit the template to be moved along the top of the template slides, and then tightening each of the template locking screws when the template is in the desired location with respect to the template slide.

Additional advantages of this invention will become apparent from the description which follows, taken in conjunction with the accompanying drawings.

DETAILED DESCRIPTION OF THE PREFERRED EMBODIMENT

Figure 1:
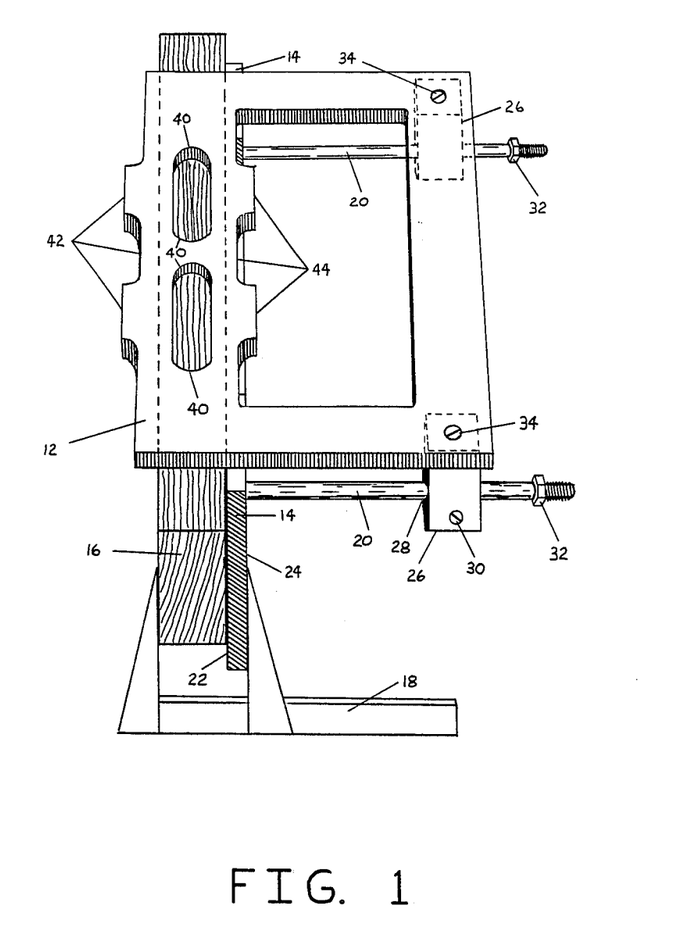
FIG. 1 is a perspective view of a tool usable to produce mortise and tenon joints, adjusted to permit the formation of one or multiple mortises in a workpiece held in place adjacent to the tool.

The features of the mortise and tenon formation technique according to the present invention can be better understood by reference to FIG. 1. As is shown in FIG. 1, a tool includes a template 12 which is positioned perpendicular and adjacent to a rigid plate 14. A workpiece 16 is held adjacent to one face 22 of the rigid plate 14, by a holding device such as a clamp 18. The position of the template 12 with respect to the workpiece 16 is determined by moving the template 12 along a plurality of rods 20, which rods extend from the face 24 of the rigid plate 14 which is opposite the face 22 of the rigid plate 14 to which the workpiece 16 is held in place. The rods 20 extend perpendicular to the face 24 of the rigid plate 14, and parallel to the template 12.

The template 12 is slideably attached to the rods 20 by template slides 26. A variety of configurations are possible for the template slides 26. As shown in FIG. 1, each template slide 26 may be a cube or other box-shaped device, with a hole 28 extending from one side of the box to the other, allowing the template slide 26 to surround a rod 20. Alternatively, the template slides may consist of a single connecting piece such as a strip of angle iron, attached to the underside of the template 12, with a plurality of openings designed to encompass and slide along the rods 20. The size of the hole 28 is sufficiently larger than the rod 20 to permit the template slide 26 to be easily moved along the rod 20. The size of the holes 28 may be decreased, and the ease of movement of the template slides 26 restricted, so that the template 12 is held in a designated position with respect to the rods 20, and thus with respect to the rigid plate 14. Various methods of restricting the movement of the template slides 26 are possible. FIG. 1 demonstrates the use of slide locking screws 30 to tighten the template slides 26 around the rods 20, arresting the motion of the template slides 26 along the rods 20.

The scope of the movement of the template slides 26 along the rods 20 is determined by the length of the rods 20. A limitation to the scope of the movement of the template slides 26 may be created by placing a limiting block larger than the holes 28 at a desired position along the rods 20. Such a limiting block may be established in an adjustable manner by threading a thickness adjusting nut 32 on the end of each rod 20. The thickness adjusting nut 32 has the advantage of being measurably and minutely adjustable to permit simple and exact changes in the position of each template slide 26 when the template slides are extended to the outermost length of the rods 20. This adjustment permits each set of tenons to be formed with a series of cuts, with the template position with respect to the rigid plate and workpiece slightly and sequentially adjusted for each cut by loosening the thickness adjusting nuts 32, until the tenon thickness achieved precisely fits the matching mortises.

The position of the template 12 with respect to the workpiece 16 may be further adjusted by permitting the template 12 to be moved along the top of the template slides 26. As shown in FIG. 1, template locking screws 34 may be installed through the template 12 into a slide (not shown) within the template slides 26. The template locking screws 34 may be loosened to permit the template 12 to be moved to a different position with respect to the template slides 26. The template locking screws 34 may be tightened to secure the template 12 in a particular position along the template slides 26. This adjustment permits the position of the template with respect to the workpiece to be altered to permit mortises and tenons to be formed in various locations across stock of varying widths, including but not limited to the middle of the workpiece.

As can be seen by reference to FIG. 1, the template 12 includes three distinct cutting guides, a mortise guide, first tenon guide, and second tenon guide. The mortise guide 40 is formed by an edge 40 formed into the template 12, having a plurality of openings through which a router bit may be inserted. The mortise guide 40 may be a variety of shapes and sizes, corresponding to the shape and size of the mortises to be formed. The number of openings of the mortise guide 40 will be determined by the number of contiguous mortises to be formed in a single workpiece.

Figure 2:
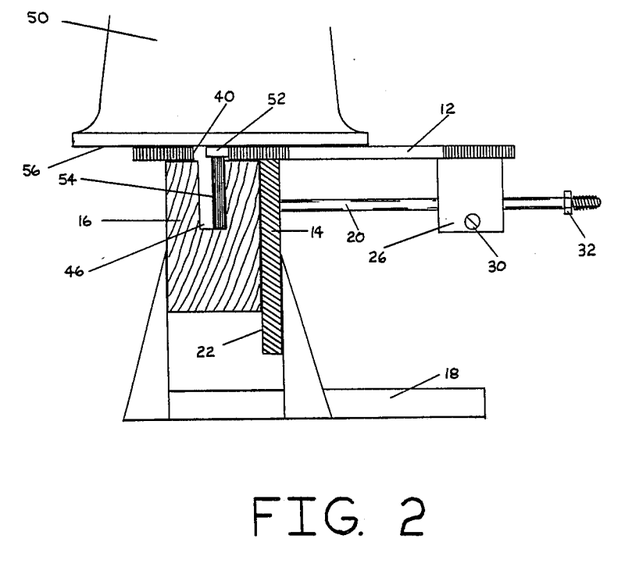
FIG. 2 is a cross-sectional view of a mortise being formed by the cutting action of a router inserted through a mortise guide of the tool of FIG. 1.

The method of creating a mortise according to the present invention is best illustrated by FIG. 2. A workpiece 16 is held adjacent to one face 22 of the rigid plate 14 by means of a holding device such as a clamp 18. With the slide locking screws 30 loosened to permit the movement of the template slides 26 along the rods 20, the template 12 is positioned so that the mortise guide 40 is located directly above the position in the workpiece 16 where the mortise 46 is desired. In most situations, the mortise guide 40 will be aligned in the center of the workpiece 16. Guide markings (not shown) on the upper face of the template 12 or inside the interior of the mortise guide may be used to position the workpiece 16 with respect to the template 12 to fashion the mortise 46 in the center of the workpiece 16. If the mortise 46 is desired closer to one edge of the workpiece than the other, the template can simply be moved to align the mortise guide 40 over the appropriate position on the workpiece 16. Once the template 12 is properly aligned with respect to the workpiece 16, the slide locking screws 30 are tightened to hold the template 12 in place with respect to the rods 20 and the rigid plate 14. If further adjustments are desired in the location of the mortise guide 40 with respect to the workpiece 16, the template locking screws 34 may be loosened to permit adjustment of the position of the template 12 with respect to the template slides 26.

A router 50, equipped with a guide bushing 52 or other guide mechanism, is lowered onto the template so that the router bit 54 is inserted into the workpiece 16 through the mortise guide 40. A plunging router may be conveniently used, or the router bit inserted into a hole in the workpiece created by a drill. To provide a consistent depth of the mortise 46, the base 56 of the router 50 is held adjacent to the template 12, as shown in FIG. 2. The router 50 is then used to cut the mortise 46 as the router guide 52 is moved adjacent to and within the mortise guide 40, to form the mortise 46 of the same shape as the mortise guide 40.

The router bit 54 is inserted in each of the openings of the mortise guide 40, and guided around the edges of that opening to create successive mortises. The mortise guide 40 may include any number of mortise openings, conveniently spaced with respect to each other. If the mortise guide 40 is constructed with fewer openings than the number of mortises desired to be formed in a particular workpiece, the workpiece 16 may be unclamped from the rigid plate 14, and moved to place the mortise guide 40 adjacent to a new section of the workpiece, permitting the mortise guide 40 to be used to fashion mortises duplicating those already formed, at a new location on the workpiece 16.

Figure 3:
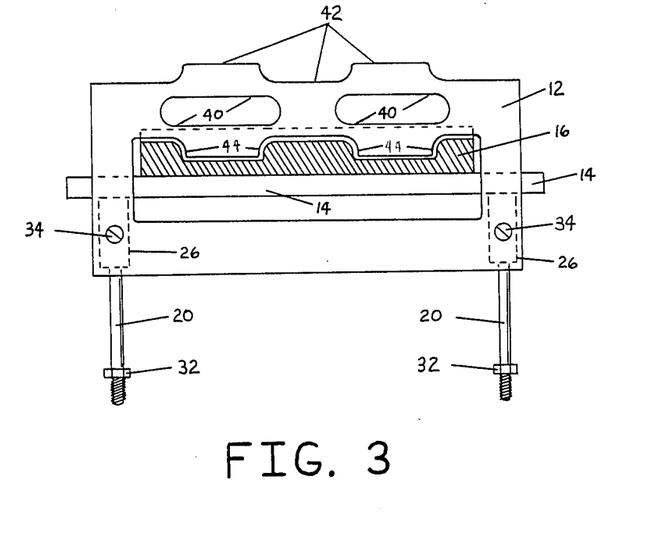
FIG. 3 is a top view of the tool shown in FIGS. 1 and 2, illustrating the formation of one half of a single or multiple tenons in a workpiece held in place adjacent to the tool, by the cutting action of a router moved along the first tenon guide of the tool.

The tenons are formed in a two step process. The workpiece in which the tenons are to be created is held against the rigid plate 14, as shown in FIG. 3. Although the rods 20 may be any length, and the spacing between the tenon cutting guides 42 and 44 may be any width, the tool may be advantageously constructed so that half of a tenon centered in a workpiece of the most frequently encountered width is fashioned when the template 12 is positioned so that the template slides 26 are adjacent to the rigid plate 14. Measurable changes in the width of the tenon to be formed may be accomplished by placing a shim (not shown) between the template slides 26 and the plate 14, thereby adjusting the position of the first tenon cutting guide 44 with respect to the workpiece 16 so as to enable tenons to be cut in stock which is wider than the most frequently encountered width for which the template is designed.

The position of the tenon to be formed may be adjusted across the workpiece 16 by adjusting the location of the template 12 with respect to the template slides 26. This step may be most conveniently accomplished by positioning the template 12 so that the mortise guide 40 is directly over the desired tenon location in the workpiece 16. Guide markings on the upper face of the template 12 or in the interior of the mortise guide 40 may be used to aid in establishing the appropriate location of the template with respect to the template slides. This adjustment is accomplished by loosening the template locking screws 34, moving the template 12, and tightening the template locking screws 34.

Figure 4:
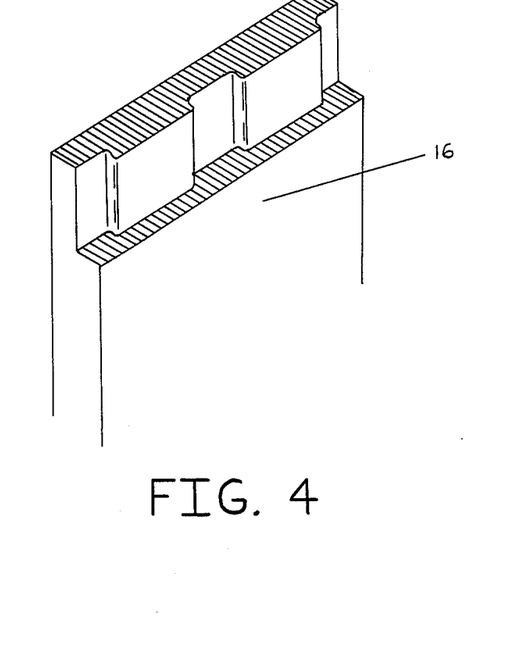
FIG. 4 is a view of a workpiece in which one half of multiple tenons has been fashioned by use of the mortise and tenon formation apparatus and method of this invention.

Once the location of the template 12 with respect to the template slides 26 is established, the template slides 26 are moved adjacent to the rigid plate 14. The router 50 (not shown in FIG. 3) is placed so that the router guide is held adjacent to the first tenon guide 44. As the router is advanced into the workpiece 16, and moved along the first tenon guide 44, with the router bit rotating, part of the workpiece 16 is cut away, to reveal one half of a set of tenons, as shown in FIG. 4. To facilitate the placement of the router 50 in the first tenon guide 44, the rigid plate 14 may be a U-shape, extending from a more or less rectangular base to the lower face of the template 12 only outside the area which may be reached by the router bit 54 when inserted in the first tenon guide 44.

Figure 5:
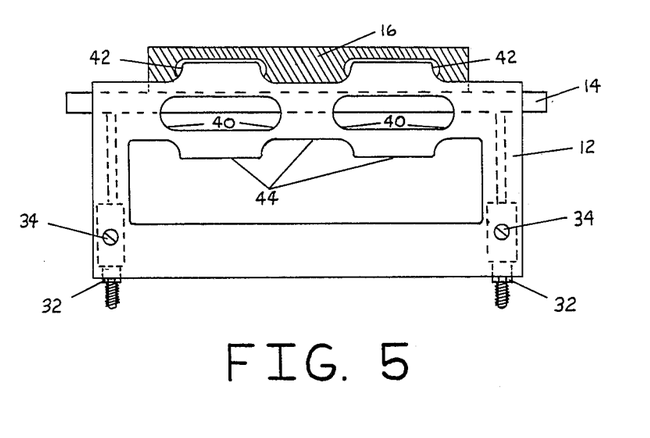
FIG. 5 is a top view of the tool shown in FIGS. 1, 2, and 3, illustrating the formation of the second half of a single or multiple tenons in a workpiece held in place adjacent to the tool, by the cutting action of a router moved along the second tenon guide of the tool.

Without moving the workpiece 16 from the rigid plate 14, the template 12 is repositioned along the rods 20, as shown in FIG. 5, so that the second tenon guide 42 is positioned above the workpiece 16. To move the template 12, the slide locking screws 30 are loosened, the template 12 moved along the rods 20, and the slide locking screws 30 tightened once the appropriate position has been reached.

The template 12 may be advantageously moved to the position along the rods 20 which is opposite the position in which the first half of the tenons was formed. Thus, if the first half of the tenons was formed with the template slides 26 adjacent to the rigid plate 14, the template is now moved to the extreme end of the rods 20, so that the template slides 26 are adjacent to the thickness adjusting nuts 32. On the other hand, if tenons are desired of a width larger than would be formed by moving the template slides 26 from one extreme position on the rods 20 to the other, a shim (not shown) may be inserted between the thickness adjusting nuts 32 and the template slides 26, and the slide locking screws 30 tightened in this position, to cause the second tenon guide 42 to be located a further distance from the first half of the tenons previously routed.

Incremental changes in the thickness of the tenon to be formed may be accomplished by adjusting the thickness adjusting nuts 32, to provide a measurable increase or decrease in the tenon width. Sequential adjustments of the thickness adjusting nuts 32 will permit incrementally thinner tenons to be formed with successive cuts using the second tenon guide 42. In this manner, the tenons may be precisely shaped to fit the matching mortises.

Figure 6:
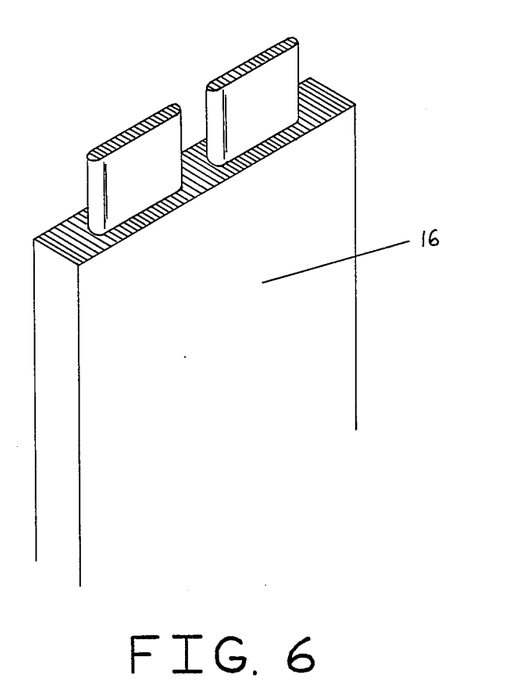
FIG. 6 is a view of a workpiece in which the second half of multiple tenons has been fashioned by use of the mortise and tenon formation apparatus and method of this invention.

The router 50 (not shown in FIG. 5) is placed so that the router guide is held adjacent to the second tenon guide 42. As the router 50 is moved along the second tenon guide 42, and advanced into the workpiece 16 with the router bit rotating, the second half of the tenon set is formed, by cutting away part of the workpieces 16. The resulting set of tenons is shown in FIG. 6.

The invention has been described in detail with particular reference to preferred embodiments thereof. As will be apparent to those skilled in the art in the light of the accompanying disclosure, many alterations, substitutions, modifications, and variations are possible in the practice of the invention without departing from the spirit and scope of the invention.

I claim:

1. A tool for forming a set of mortises and tenons in two workpieces to be joined by a mortise and tenon joint, comprising:

(a) a rigid plate adapted to contact each workpiece, and to which the workpiece may be held, (b) a template with upper and lower faces, having a mortise guide, a first tenon guide, and a second tenon guide, adjustably positioned with the lower face of the template adjacent to the rigid plate, so that each workpiece may be held adjacent to the lower face of the template and adjacent to the rigid plate, and (c) sliding means for adjusting the position of the template with respect to the rigid plate, whereby the template may be moved until the mortise guide, the first tenon guide or the second tenon guide is adjacent to the workpiece, as the workpiece is held adjacent to the rigid plate.

2. A tool as described in claim 1, wherein said sliding means comprises:
   (a) a plurality of rods extending from the rigid plate, parallel to the lower face of the template, and
   (b) a plurality of template slides, each template slide slideably mounted on one of the rods, and attached to the lower face of the template.

3. A tool as described in claim 2, wherein said sliding means further comprises:
   stopping means for arresting the motion of the template slides at any position along the rods.

4. A tool as described in claim 3, wherein said stopping means comprises a screw mechanism within each template slide so that the tightening of the screw causes the template slide to be held tightly against the rod on which that template slide is mounted.

5. A tool as described in claim 2, wherein the extent of the movement of the template slide mounted on each rod may be modified by a thickness adjusting nut on the end of each rod opposite the rigid plate.

6. A tool as described in claim 2, wherein said sliding means further comprises:
   adjusting means for altering the position of the template along the template slides.

7. A tool as described in claim 1, wherein said sliding means comprises:
   (a) a plurality of screws extending from the rigid plate, parallel to the lower face of the template,
   (b) a connecting piece attached to the lower face of the template, slideably mounted on the screws, and
   (c) holding means for holding the connecting piece at any position along the screws.

8. A tool as described in claim 1, wherein said mortise guide comprises a pattern formed into the template having a plurality of openings through which a rotating cutting blade of a router may be inserted to carve a set of mortises in a workpiece held adjacent to the lower face of the template, each opening being of a size and shape corresponding to the size and shape of the sides of a mortise to be formed in the workpiece.

9. A tool as described in claim 1, wherein said first tenon guide comprises a pattern forming one edge of an opening within the template sufficiently wide to permit a rotating cutting blade of a router to be inserted through the opening, said pattern having a configuration such that one half of a set of tenons is formed in a workpiece held adjacent to the lower face of the template and adjacent to the first tenon guide, when the rotating cutting blade is guided along the first tenon guide, causing the blade to cut away a portion of the workpiece which is not aligned directly beneath the template.

10. A tool as described in claim 1, wherein said first tenon guide comprises a pattern forming one edge of the template, said pattern having a configuration such that one half of a set of tenons is formed in a workpiece held adjacent to the lower face of the template and adjacent to the first tenon guide, when the rotating cutting blade is guided along the first tenon guide, causing the blade to cut away a portion of the workpiece which is not aligned directly beneath the template.

11. A tool as described in claim 9, wherein said second tenon guide comprises a pattern forming one edge of an opening within the template sufficiently wide to permit a rotating cutting blade of a router to be inserted through the opening, said pattern being of the size and shape of the first tenon guide and of opposite orientation to the first tenon guide.

12. A tool as described in claim 10, wherein said second tenon guide comprises a pattern forming one edge of an opening within the template sufficiently wide to permit a rotating cutting blade of a router to be inserted through the opening, said pattern being of the size and shape of the first tenon guide and of opposite orientation to the first tenon guide.

13. A tool as described in claim 9, wherein said second tenon guide comprises a pattern forming one edge of the template, said pattern being of the size and shape of the first tenon guide and of opposite orientation to the first tenon guide.

14. A tool as described in claim 10, wherein said second tenon guide comprises a pattern forming one edge of the template, said pattern being of the size and shape of the first tenon guide and of opposite orientation to the first tenon guide.

15. A tool as described in claim 11, 12, 13, or 14, wherein the distance between the second tenon guide and the mortise guide is the same as the distance between the first tenon guide and the mortise guide.

16. A tool as described in claim 11, 12, 13, or 14, wherein the pattern of the first tenon guide and the second tenon guide causes a set of tenons to be formed corresponding in size and shape to the set of mortises to be formed by inserting a rotating cutting blade into the mortise guide.

17. A method for forming a set of mortises in a workpiece, by means of a tool comprising a rigid plate, and a template adjustably connected to the rigid plate, with upper and lower faces, a mortise guide, a first tenon guide, and a second tenon guide, adjustably positioned with the lower face of the template adjacent to the rigid plate, comprising the steps of:
   (a) securing the workpiece to the rigid plate so that the workpiece is adjacent to the lower face of the template,
   (b) moving the template to a position with respect to the rigid plate such that the mortise guide is adjacent to the workpiece, and securing the template in said position,
   (c) positioning a rotating cutting blade of a router within the mortise guide so that the rotating cutting blade is inserted into the workpiece, and the router may be guided along the edges of the mortise guide, and
   (d) cutting a portion of the workpiece adjacent to the mortise guide by guiding the router along the edges of the mortise guide.

18. A method for forming a set of tenons in a workpiece, by means of a tool comprising a rigid plate, and a template adjustably connected to the rigid plate with upper and lower faces, a mortise guide, a first tenon guide, and a second tenon guide, adjustably positioned with the lower face of the template adjacent to the rigid plate, comprising the steps of:
   (a) securing the workpiece to the rigid plate so that the workpiece is adjacent to the lower face of the template,
   (b) moving the template to a position with respect to the rigid plate such that the first tenon guide is adjacent to the workpiece, and securing the template in said position,
   (c) positioning a rotating cutting blade of a router along the first tenon guide so that the rotating cutting blade is inserted into the workpiece, and the router may be guided along the first tenon guide, (d) cutting a portion of the workpiece adjacent to the first tenon guide by guiding the router along the first tenon guide, (e) moving the template to a position with respect to the rigid plate such that the second tenon guide is adjacent to the workpiece, and securing the template in said position, (f) positioning the rotating cutting blade along the second tenon guide so that the rotating cutting blade is inserted into the workpiece, and the router may be guided along the second tenon guide, and (g) cutting a portion of the workpiece adjacent to the second tenon guide by guiding the router along the second tenon guide.

* * * * *